United States Patent [19]

Yamaoka et al.

[11] Patent Number: 4,773,459
[45] Date of Patent: Sep. 27, 1988

[54] PNEUMATIC LOW SECTION TIRE

[75] Inventors: Masataka Yamaoka; Misao Kawabata, both of Saitama, Japan

[73] Assignee: Bridgestone Corporation, Tokyo, Japan

[21] Appl. No.: 57,993

[22] Filed: Jun. 4, 1987

[30] Foreign Application Priority Data

Jun. 4, 1986 [JP] Japan .................................. 61-128104

[51] Int. Cl.⁴ .................................................. B60C 11/00
[52] U.S. Cl. ............................................... 152/209 R
[58] Field of Search ........................ 152/209 R, 209 D

[56] References Cited

U.S. PATENT DOCUMENTS

| 3,559,712 | 2/1971 | Verdier | 152/209 R |
| 4,223,712 | 9/1980 | Iwata et al. | 152/209 R |
| 4,649,975 | 3/1987 | Kogure et al. | 152/209 R |
| 4,676,290 | 6/1987 | Tansei | 152/209 R |

Primary Examiner—Michael Ball
Attorney, Agent, or Firm—Sughrue, Mion, Zinn, Macpeak & Seas

[57] ABSTRACT

In a pneumatic low section tire with an aspect ratio (height/width) of 0.65 or less, when a green tire is pressurized with a bladder within a mold, tread rubber is forced to flow into recesses for forming a tread block pattern. With this rubber flow, the belt is subjected to deformation toward the same recesses, so that the belt layer deforms outward at the middle of the transversal grooves between two main circumferential grooves. This deformation causes the skid base rubber existing between the transversal groove bottom and the belt layer to be thin at the middle of the transversal grooves, thus resulting in an early trouble. To overcome this problem, the transversal grooves are formed in raised bottom or corrugation fashion along a longitudinal direction thereof, to obtain a uniformly thick skid base. Further, this raised bottom serves to increase the drainage effect during rainy weather running.

7 Claims, 2 Drawing Sheets

PNEUMATIC LOW SECTION TIRE

BACKGROUND OF THE INVENTION

1. Field of the Invention

The present invention relates to a pneumatic low section tire, and more specifically to an improvement in the tread of a pneumatic low section radial tire.

2. Description of the Prior Art

With increasing vehicle speed, recently tires have a tendency to become low in section; that is, the section height of the tire decreases but the tire width increases. Since the tread width increases with increasing tire width, a preferable type of the low section tires is as follows: 3 to 5 main straight grooves are arranged at regular intervals along the axial direction thereof extending substantially in the circumferential direction of the tread, and connected by transversal grooves having a depth the same as that of the main grooves so as to form blocks, under due consideration of drainage in rainy weather vehicle running. As low section types, radial tires are widely used, because radial structure is suitable for high speed vehicle travel.

In manufacturing a radial tire, a tread rubber with a uniform thickness is extruded and cut off into a predetermined length; the cut-off tread rubber is stuck onto a belt formed by laminating belt layers around a crown portion of a carcass together with beads and side treads, to form a green tire; the green tire is vulcanized or hardened within a mold. In this vulcanization process, a tread pattern including various grooves or blocks are formed by the mold. To form a pattern on the tire tread, various U-shaped skeletal protrusions are arranged in the inner wall of the mold. The height of the skeletal protrusions is about 9 to 16 mm in the case of the ordinary passenger tires, although being different according to the tire size.

When a green tire is pressurized within the mold by applying steam pressure from the inner opening of the tire with a bladder, tread rubber with a relatively high viscosity (although softed a little by heat) is forced to flow into recesses formed between the skeletal protrusions to form tire tread blocks. In a low section tire with an aspect ratio of the section height of the tire to the maximum tire width in cross section of 0.65 or less the tread width increases with increasing tire width and further the green tread rubber is flat with a substantially uniform rubber thickness along the axial (width) direction of the tire. When the tread rubber flows into the mold recesses for forming pattern blocks between two circumferential grooves during vulcanization process, the belt itself is subjected to the influence of the flow of the green rubber and therefore inevitably deformed toward the recesses. When the deformed green tire is vulcanized or hardened as it is, the belt layers rise or are corrugated outward along the longitudinal direction of the transversal grooves formed between two main grooves. The maximum deformation is produced at the middle portion of the transversal groove between two adjacent main grooves, this brings up a problem in that a skid base rubber existing between the groove bottom and the belt layer with a uniform thickness becomes too thin at the middle portion of the transversal groove due to the influence of an outward deformation of the belt layer, thus resulting in premature problems with the tire of low section type.

SUMMARY OF THE INVENTION

With these problems in mind, therefore it is the primary object of the present invention to provide a pneumatic low section tire which can prevent the skid base gage (standard thickness) from being reduced excessively, even if the belt layer is deformed into corrugation during vulcanization process, in addition to an improvement in drainage effect from the transversal grooves to the main circumferential grooves during rainy weather running.

To achieve the above-mentioned object, a pneumatic low section tire having a tread pattern formed with a plurality of main grooves substantially extending in the tire circumferential direction in parallel to each other and a plurality of transversal grooves intersecting the main circumferential grooves at an inclination angle also in parallel to each other, according to the present invention, is characterized in that the transversal grooves are formed in upward sloping raised bottom fashion along a longitudinal direction thereof between two main circumferential grooves.

The bottoms of the transversal grooves are raised in equilateral triangle shape in cross section in such a way that the transversal groove depth is the shallowest at the middle of each transversal groove and the deepest at the bottom of the main circumferential groove. The bottoms of the transversal grooves can be smoothly corrugated in the same way. The ratio of the raised bottom height to the transversal groove depth is approximately $\frac{1}{8}$.

In summary, the bottoms of the transversal grooves are raised in order to compensate the skid base rubber for a decrease in thickness due to the deformation of the belt toward the block forming recesses formed in a vulcanizing mold, which is peculiar to the low section tires.

BRIEF DESCRIPTION OF THE DRAWINGS

The features and advantages of the pneumatic low section tire according to the present invention will be more clearly appreciated from the following description taken in conjunction with the accompanying drawings in which.

DETAILED DESCRIPTION OF THE PREFERRED EMBODIMENTS

Figure 1:
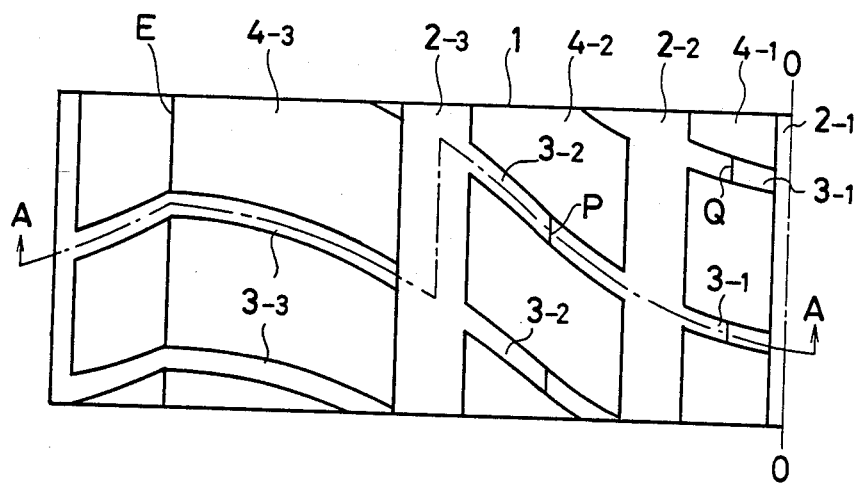
FIG. 1 is a plan view showing a tire of a first embodiment of the present invention.

The tire according to the present invention will be described hereinbelow with reference to the attached drawings. FIG. 1 is a half lefthand view showing a tread 1 symmetrical with respect to the equatorial plane O—O. The tire size is of 245/45 VR16. The carcass is of radial construction composed of two rayon cord plies. The belt is such that two steel cord layers each inclined 22 degrees with respect to the circumferential direction of the tire are arranged on the crown portion of the carcass so as to intersect each other. These structures of the carcass and the belt are well known, therefore the more detailed description thereof being omitted herein.

The ratio of the section height to the width (in cross section) of the tire shown in FIG. 1 is 0.45. On the tread 1 of the tire, there are arranged a plurality of main circumferential grooves 2-1, 2-2 and 2-3 extending in parallel to the equatorial plane O—O at regular intervals. The width (W-1) (shown in FIG. 2) of the central main groove is 6.1 mm; that (W-2) of the middle main groove is 12.8 mm; and that (W-3) of the leftmost main groove is 14.0 mm. In addition, a plurality of transversal grooves with a relatively narrow width extend at an inclination angle with respect to the main circumferential grooves so as to partition a plurality of blocks. For instance, a block 4-1 is partitioned by the two main grooves 2-1 and 2-2 and the two transversal grooves 3-1; a block 4-2 is partitioned by the two main grooves 2-2 and 2-3 and the two transversal grooves 3-2; and a block 4-3 is partitioned by the main grooves 2-3 and the tread end E and the two transversal grooves 3-3.

Figure 2:
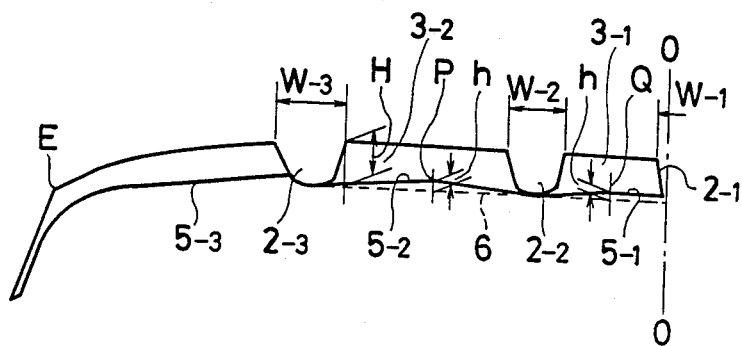
FIG. 2 is a cross-sectional view taken long the lines A—A shown in FIG. 1.

The feature of the present invention is to form the transversal grooves in a raised bottom fashion; that is, to form each bottom surface 6 of each transversal groove 3-1 or 3-2 with equilateral triangle shape slopes 5-2 in cross section, except the outermost transversal groove 5-3 in FIG. 2.

In more detail, in FIG. 2, the transversal groove 3-2 formed between two main circumferential grooves 2-2 and 2-3 is formed with a raised bottom in such a way that a slope top with a height h from a dashed line 6 connecting both the bottoms of the two main grooves 2-2 and 2-3 is located at the middle P of the longitudinal length of the transversal grooves 3-2. In other words, the bottom surface 5-2 of the transversal grooves 3-2 is so formed that the depth thereof is shallowest at the middle position P and slopes down to the bottom of the main grooves 2-3 and 2-2 in FIG. 2. The depth H of the main groove is about 8.1 mm, while the slope height h of the transversal groove 3-2 is about 1 mm.

Further, the bottom surface 5-1 of the transversal groove 3-1 is so formed that the depth thereof is shallowest at the middle position Q and slopes down to the bottom of the main groove 2-2 but extends with the same depth to the central main groove 2-1, as depicted in FIG. 2. It is preferable to determine the slope height h to lie within 0.5 to 1.5 mm in the transversal groove 3-1 formed between the two main grooves 2-1 and 2-2 and in that 3-2 formed between the two main grooves 2-2 and 2-3, according to the tire size and the block dimensions. On the other hand, it should be noted that no raised bottom is provided for the bottom surface 5-3 of the outermost transversal grooves 3-3.

Figure 3:
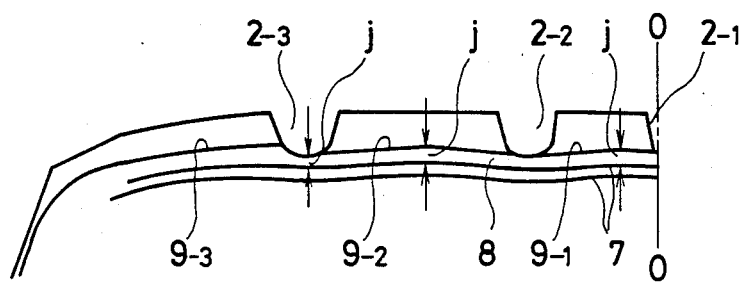
FIG. 3 is a similar cross-section view showing a tire of a second embodiment of the present invention, taken along the same lines A—A shown in FIG. 1.

FIG. 3 shows a second embodiment of the tire according to the present invention. In this second embodiment, the bottom surface of the transversal grooves bottoms 9-1, 9-2 and 9-3 are formed so as to be corrugated with a uniform thickness j in parallel to the two corrugated belt layers 7. The depth of the transversal groove is the shallowest at the middle position of the transversal grooves. Therefore, a skid base rubber 8 existing between the bottoms of the transversal grooves and the belt layers 7 is kept substantially uniform extending from the central main groove 2-1, through the intermediate main groove 2-2, to the outermost main groove 2-3.

The following data were obtained by some production tests: the tires were formed with raised bottoms according to the present invention as shown in FIGS. 1 and 2, the skid base gage (thickness) was within a range of 1.8 to 2.2 mm along the transversal grooves; while where the prior-art tires were formed with no raised bottoms (the bottom surfaces were formed flat as shown dashed lines in FIG. 2) but with the same tread pattern as shown in FIG. 1, the skid base gage was about 2.8 mm under the main circumferential grooves but as thin as about 1.4 mm at the middle positions P and Q of the transversal grooves.

What is claimed is:

1. A pneumatic low section tire having a tread pattern comprising; a plurality of main grooves substantially extending in a circumferential direction of the tire in parallel to each other and a plurality of transversal grooves intersecting the main circumferential grooves at an inclination angle also in parallel to each other, said transversal grooves formed in upward sloping raised bottom fashion along a longitudinal direction thereof between two main circumferential grooves, bottoms of said transversal grooves are raised in substantially equilateral triangle shape in cross section in such a way that a depth of said transversal groove is the shallowest at substantially the middle portion of the each transversal groove and the deepest at the bottom of said main circumferential groove.

2. The pneumatic low section tire as set forth in claim 1, wherein an aspect ratio of section height to width of the flat tire is 0.65 or less.

3. The pneumatic low section tire as set forth in claim 1, wherein said transversal grooves except two outermost transversal grooves are formed with a raised bottom.

4. The pneumatic low section tire as set forth in claim 1, wherein a raised bottom height h of said transversal groove is 0.5 to 1.5 mm.

5. The pneumatic low section tire as set forth in claim 1, wherein a ratio of raised bottom height h to transversal groove depth H is approximately $h/H = \frac{1}{8}$.

6. The pneumatic low section tire as set forth in claim 1, wherein the bottoms of said transversal grooves are raised and flat near an equatorial plane of the tire.

7. A pneumatic low section tire having a tread pattern comprising; a plurality of main grooves substantially extending in a circumferential direction of the tire in parallel to each other and a plurality of transversal grooves intersecting the main circumferential grooves at an inclination angle also in parallel to each other, said transversal grooves formed in upward sloping raised bottom fashion along a longitudinal direction thereof between two main circumferential grooves, bottoms of said transversal grooves smoothly corrugated in such a way that a depth of said transversal groove is the shallowest at the middle position of each transversal groove and the deepest at the bottom of said main circumferential groove

* * * * *